United States Patent
Kim et al.

(10) Patent No.: US 11,178,144 B2
(45) Date of Patent: *Nov. 16, 2021

(54) APPARATUS AND METHOD BY WHICH USER DEVICE IN HOME NETWORK SYSTEM TRANSMITS HOME-DEVICE-RELATED INFORMATION

(71) Applicant: Samsung Electronics Co., Ltd., Suwon-si (KR)

(72) Inventors: Jun-Hyung Kim, Yongin-si (KR); Se-Hoon Kim, Seoul (KR); Jai-Ick Chun, Seoul (KR); Dong-Keon Kong, Suwon-si (KR); Eun-Hui Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

This patent is subject to a terminal disclaimer.

(21) Appl. No.: 16/263,651

(22) Filed: Jan. 31, 2019

(65) Prior Publication Data

US 2019/0166124 A1    May 30, 2019

Related U.S. Application Data

(63) Continuation of application No. 15/024,282, filed as application No. PCT/KR2014/008780 on Sep. 22, 2014, now Pat. No. 10,200,366.

(Continued)

(30) Foreign Application Priority Data

Jun. 18, 2014  (KR) .................. 10-2014-0074051

(51) Int. Cl.
*H04L 9/30* (2006.01)
*H04L 29/06* (2006.01)
(Continued)

(52) U.S. Cl.
CPC ........ *H04L 63/0876* (2013.01); *G06F 21/335* (2013.01); *H04L 9/0866* (2013.01);
(Continued)

(58) Field of Classification Search
CPC ........ H04W 12/06; G06F 21/45; H04L 12/28; H04L 63/08; H04L 63/0876
See application file for complete search history.

(56) References Cited

U.S. PATENT DOCUMENTS

| 7,752,329 B1 | 6/2010 | Meenan et al. |
| 2001/0038392 A1 | 11/2001 | Humpleman et al. |

(Continued)

FOREIGN PATENT DOCUMENTS

| CN | 1655506 A | 8/2005 |
| CN | 101099330 A | 1/2008 |

(Continued)

OTHER PUBLICATIONS

Korean Office Action with English translation dated Apr. 16, 2021; Korean Appln. No. 10-2014-0126571.

(Continued)

*Primary Examiner* — Wasika Nipa
(74) *Attorney, Agent, or Firm* — Jefferson IP Law, LLP

(57) ABSTRACT

An apparatus and method by which a user device in a home network system transmits home-device-related information is provided. The method includes acquiring, from at least one home device, a unique user identifier (UUID) for a related home device, a peer ID (peer ID) which is managed by a connectivity server for managing a connection between the user device and the related home device and that identifies the related home device, a peer group ID for identifying a group of home devices that have registered with a service server for managing device information on the related home device, and a device token containing key (Continued)

information for authenticating the connection to the related home device, selecting a specific user device which will share the UUID, peerID, peer group ID and device token from among neighboring devices, and transferring the UUID, peerID, peer group ID, and device token to the specific user device on the basis of a predetermined sharing method.

14 Claims, 11 Drawing Sheets

Related U.S. Application Data

(60) Provisional application No. 61/881,114, filed on Sep. 23, 2013.

(51) Int. Cl.
| | | |
|---|---|---|
| *H04L 9/08* | (2006.01) | |
| *H04L 9/32* | (2006.01) | |
| *H04W 12/06* | (2021.01) | |
| *H04W 12/04* | (2021.01) | |
| *H04W 4/70* | (2018.01) | |
| *H04L 29/08* | (2006.01) | |
| *H04L 12/28* | (2006.01) | |
| *H04L 12/12* | (2006.01) | |
| *G06F 21/33* | (2013.01) | |
| *H04W 12/37* | (2021.01) | |
| *H04W 12/50* | (2021.01) | |
| *H04W 4/06* | (2009.01) | |
| *H04W 4/08* | (2009.01) | |

(52) U.S. Cl.
CPC ............ *H04L 9/3226* (2013.01); *H04L 12/12* (2013.01); *H04L 12/282* (2013.01); *H04L 63/062* (2013.01); *H04L 63/0807* (2013.01); *H04L 63/0869* (2013.01); *H04L 67/125* (2013.01); *H04W 4/70* (2018.02); *H04W 12/04* (2013.01); *H04W 12/06* (2013.01); *H04W 12/37* (2021.01); *H04W 12/50* (2021.01); *G06F 2221/2137* (2013.01); *H04W 4/06* (2013.01); *H04W 4/08* (2013.01); *Y02D 30/50* (2020.08)

(56) References Cited

U.S. PATENT DOCUMENTS

| | | |
|---|---|---|
| 2003/0169728 A1 | 9/2003 | Choi |
| 2005/0149758 A1* | 7/2005 | Park .................. H04L 9/3236 726/4 |
| 2006/0177066 A1 | 8/2006 | Han et al. |
| 2007/0162762 A1 | 7/2007 | Huh et al. |
| 2008/0229406 A1 | 9/2008 | Go |
| 2013/0082827 A1 | 4/2013 | Cho et al. |
| 2013/0086232 A1 | 4/2013 | Hwang et al. |
| 2013/0148149 A1 | 6/2013 | Park et al. |
| 2013/0173811 A1 | 7/2013 | Ha et al. |
| 2014/0020081 A1* | 1/2014 | Zhang ................. H04L 63/083 726/9 |

FOREIGN PATENT DOCUMENTS

| | | |
|---|---|---|
| KR | 10-2005-0040311 A | 5/2005 |
| KR | 10-2005-0083042 A | 8/2005 |
| KR | 10-2007-0042771 A | 4/2007 |
| KR | 10-2007-0074397 A | 7/2007 |
| KR | 10-2012-0063230 A | 6/2012 |
| KR | 10-2012-0072518 A | 7/2012 |
| KR | 10-2013-0035673 A | 4/2013 |
| KR | 10-2013-0035716 A | 4/2013 |
| KR | 10-2013-0066557 A | 6/2013 |
| WO | 2006/083141 A1 | 8/2006 |
| WO | 2012/060021 A1 | 5/2012 |

OTHER PUBLICATIONS

Korean Office Action with English translation dated Apr. 28, 2021; Korean Appln. No. 10-2021-0002083.

* cited by examiner

APPARATUS AND METHOD BY WHICH USER DEVICE IN HOME NETWORK SYSTEM TRANSMITS HOME-DEVICE-RELATED INFORMATION

CROSS-REFERENCE TO RELATED APPLICATION(S)

This application is a continuation application of prior application Ser. No. 15/024,282, filed on Mar. 24, 2016, which was the National Stage under 35 U.S.C. § 371 of International Application number PCT/KR2014/008780, filed on Sep. 22, 2014, which claimed priority 35 U.S.C § 119(a) of a Korean Patent Application number 10-2014-0074051, filed on Jun. 18, 2014, in the Korean Intellectual Property Office and which claimed priority under 35 U.S.C. § 119(e) of a U.S. Provisional Application Ser. No. 61/881,114, filed on Sep. 23, 2013, the disclosure each of which is incorporated by reference herein in its entirety.

TECHNICAL FIELD

The present disclosure relates to an apparatus and a method for transferring home device-related information in a home network system by a user device.

BACKGROUND

A home network system refers to a system that connects home devices that are installed in a house through a wired or wireless network so as to control the home devices. A developed home network system combines home devices through a home gateway (HGW) to connect the home devices to an external public data network, for example, an Internet protocol (IP) network (that is, Internet), thereby providing more various services that are linked to the Internet. The home network system may provide a service which a user desires, by controlling the home devices according to a user's demand.

In such systems, user devices are required to perform a process of registering each of the home devices to control the home devices in the home network system. However, all of the user devices have to individually register each of the home devices in the general home network system, which deteriorates usability. Further, as the number of user devices and the number of home devices to be registered increases, operations required for performing the registration process also increase, and thus it takes an excessively long time to perform the registration process.

Accordingly, efforts are needed to more efficiently improve the registration process between the user device and the home devices.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a method and an apparatus for transferring home device-related information by a user device in a home network system.

Another aspect of the present disclosure is to provide a method and an apparatus for sharing home device-related information with a neighboring user device by a user device in a home network system.

In accordance with an aspect of the present disclosure, a method of transmitting information related to a home device in a home network system by a user device is provided. The method includes acquiring, from at least one home device, a unique user identifier (UUID) of the related home device, a peer ID (peerID) for identifying the related home device, the peerID being managed by a connectivity server managing a connection between the user device and the related home device, a peer group ID (peerGroupID) for identifying a group that includes home devices registered in a service server managing device information on the related home device, and a device token containing information on a key for authenticating access to the related home device, and transmitting the UUID, peerID, peerGroupID, and device token to a neighboring device of the user device.

In accordance with another aspect of the present disclosure, a method of managing information related to a home device in a home network system by a service server is provided. The method includes receiving, from a user device, at least one of a UUID of a related home device, a peerID for identifying the related home device, the peerID being managed by a connectivity server managing a connection between the user device and the related home device, a peerGroupID for identifying a group that includes home devices registered in a service server managing device information on the related home device, and a device token containing information on a key for authenticating access to the related home device, and copying registered home device information on the user device such that home device information on a neighboring device of the user device becomes identical to the registered home device information on the user device.

In accordance with another aspect of the present disclosure, a user device for transmitting information related to a home device in a home network system is provided. The user device includes a controller that acquires a UUID of a related home device, a peerID for identifying the related home device, the peerID being managed by a connectivity server managing a connection between the user device and the related home device, a peerGroupID for identifying a group that includes home devices registered in a service server managing device information on the related home device, and a device token containing information on a key for authenticating access to the related home device, from at least one home device, and a transmitter that transmits the UUID, peerID, peerGroupID, and device token to a neighboring device of the user device.

In accordance with another aspect of the present disclosure, a service server for managing home device-related information in a home network system is provided. The service server includes a receiver that receives at least one of a UUID of a related home device, a peerID for identifying the related home device, the peerID being managed by a connectivity server managing a connection between the user device and the related home device, a peerGroupID for identifying a group that includes home devices registered in a service server managing device information on the related home device, and a device token containing information on a key for authenticating access to the related home device, from at least one home device, and a controller that copies registered home device information on the user device such that home device information on a neighboring device of the user device becomes identical to the registered home device information on the user device.

According to the present disclosure, when a plurality of user devices belonging to respective family members exist in a house in a home network system, the user devices share information on a home device, so that an inconvenient registration process of home devices through all of the user devices can be mitigated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numerals are used to depict the same or similar elements, features, and structures.

DETAILED DESCRIPTION

Figure 1:
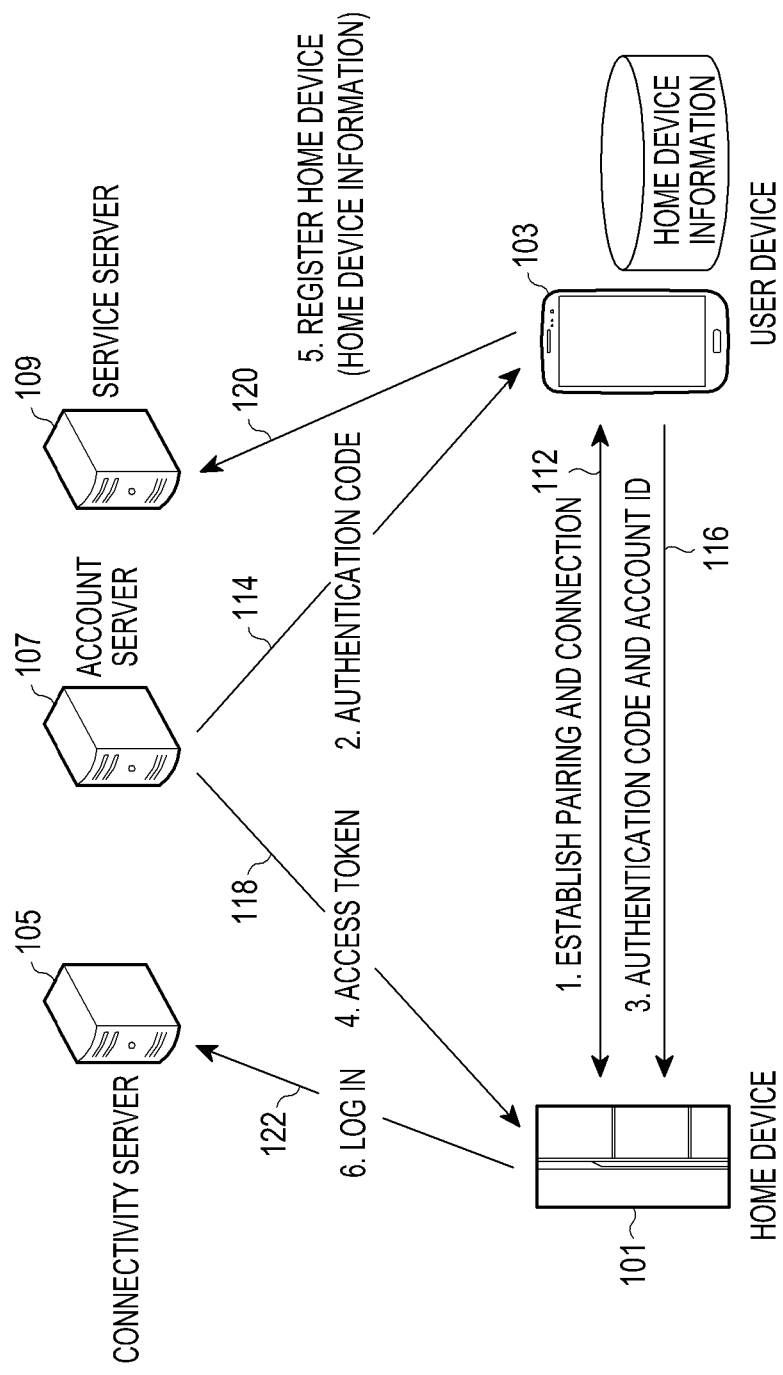
FIG. 1 illustrates an example of a process of registering a home device in a server in a home network system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly indicates otherwise. Thus, for example, reference to "a component surface" includes reference to one or more of such surfaces.

Prior to the detailed description of the present disclosure below, it may be effective to configure definitions of specific words and phrases used in this patent document. The terms "include", "comprise", and derivatives thereof may mean inclusion without limitation, the term "or" may have an inclusive meaning and means "and/or", the phrases "associated with", "associated therewith", and derivatives thereof may mean "to include", "be included within", "interconnect with", "contain", "be contained within", "connected to or with", "coupled to or with", "be communicable with", "cooperate with", "interleave", "juxtapose", "be proximate to", "be bound to or with", "have", and "have a property of", the term "controller" may mean any device, system, or a part thereof that controls at least one operation, and such a device may be implemented in hardware, firmware, software, or some combinations thereof. It should be noted that the functionality associated with any particular controller may be centralized or distributed, whether locally or remotely. The definitions of the particular words and phrases are provided and used throughout this patent document. Those skilled in the art should understand that the above definitions can be applied to the further use of the defined words and phrases as well as to the prior art.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

In the present disclosure, the terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present disclosure, an electronic device may include a communication functionality. The terminal may, for example, be a smart phone, tablet personal computer (PC), mobile phone, video phone, e-book reader, desktop PC, laptop PC, netbook PC, personal digital assistant (PDA), portable multimedia player (PMP), Moving Picture Experts Group phase 1 or phase 2 (MPEG-1 or MPEG-2) audio layer 3 (MP3) player, mobile medical device, camera, or wearable device (e.g., head-mounted device (HMD), electronic clothes, electronic bracelet, electronic necklace, electronic appcessory, electronic tattoo, or smart watch).

According to various embodiments of the present disclosure, the electronic device may be a smart home appliance with a communication functionality. The smart home appliance may, for example, be a television (TV), digital versatile disc (DVD) player, audio player, refrigerator, air conditioner, vacuum cleaner, oven, microwave, washer, dryer, air purifier, set-top box, TV box (e.g., Samsung HomeSync™, Apple TV™, or Google TV™), gaming console, electronic dictionary, camcorder, or electronic photo frame.

According to various embodiments of the present disclosure, the terminal may be a medical appliance (e.g., magnetic resonance angiography (MRA) device, magnetic resonance imaging (MRI) device, computed tomography (CT) device, and ultrasonic device), navigation device, global positioning system (GPS) receiver, event data recorder (EDR), flight data recorder (FDR), automotive infotainment device, marine electronic device (e.g., ship navigation device and gyrocompass), avionics, security equipment, or an industrial or home robot.

According to various embodiments of the present disclosure, the electronic device may be a part of furniture or a building/structure, an electronic board, electronic signature receiving device, projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

According to various embodiments of the present disclosure, a user terminal may be, for example, an electronic device.

An embodiment of the present disclosure will describe a method of registering a home device in a user terminal through servers for providing services linked between the inside and outside of the house, for example, a service server, an account server, and a connectivity server among the service server and the account server, a push server, and firmware management server, and a method of transmitting and receiving a service signal by a user terminal and a home device through a link between the service server, account server, and connectivity server.

FIG. 1 illustrates an example of a process of registering a home device in a server in a home network system according to an embodiment of the present disclosure.

Prior to the description of FIG. 1, it is assumed that controlled devices are installed in a home or outside the home, for example, home devices that have been already connected to a controller device, for example, a user device. That is, a newly purchased home device passes through a pre-process of establishing a connection with the user device in an initial installation and, at this time, the user device acquires and stores device information on the newly purchased home device, peer group identifier (ID) (peerGroupID), and a country code (countryCode). The device information on the home device includes, for example, a unique user ID (UUID) corresponding to a unique ID of the home device, type, name, description, manufacturer, model ID, serial number (serialNumber), sales location (salesLocation), version (versions), and the like. The peerGroupID indicates a group of home devices registered in a service server through a particular user account, and the countryCode indicates a country in which a user of a controller device is located.

Referring to FIG. 1, a home network system includes a home device 101, a user device 103, a connectivity server 105, an account server 107, and a service server 109.

The user device 103 refers to a device used for identifying a state of the home device 101 or controlling the home device 101 by the user and may be, for example, a mobile terminal, such as a TV, smart phone, or the like. The user device 103 can store and manage at least some home device information.

The home device 101 refers to a device which is located in a house or outside the house and can be controlled through the user device 103, and includes smart appliances, security devices, lighting devices, energy devices, and the like. For example, the smart appliance may be a TV, air conditioner, refrigerator, washing machine, robot cleaner, humidifier, and the like, the security device may be a door lock, security camera, closed circuit TV (CCTV), security sensor, and the like, the lighting device may be a light emitting diode (LED), lamp, and the like, and the energy device may be a heating device, power measurement unit, power socket, electric outlet, multi-tap, and the like. Additionally, the home device 101 may include a PC, Internet protocol (IP) camera, Internet phone, wired/wireless phone, electrically controlled curtain, blind, and the like.

The connectivity server 105 refers to a server that provides a service for configuring a communication channel between the home device 101 and the user device 103. Further, the connectivity server 105 provides presence information indicating whether the connection between the home device 101 and the user device 103 is possible and a network address translation-traversal (NAT-T) function that makes the mutual connection possible by penetrating a firewall, even by a remote control.

The account server 107 refers to a server that manages an account of a user of the user device 103. Further, the account server 107 provides a function that allows the user device 103 to access the service server 109 and the connectivity server 105 by using user login information when the user logs into the account server 107.

The connectivity server 105 and the account server 107 are public servers, which can be used in another service as well as the service provided in the home network system. In contrast, the service server 109 is a server that is operated only for the service provided in the home network system and provides a function that stores and manages home device information for reading information on the home device 101 and all pieces of information for controlling the home device 101.

The user may access the service server 109 through an application, for example, a smart home app executed in the user device 103 to register home device information or read or delete pre-registered home device information, or to register control information for collectively controlling the home devices or to read or delete pre-registered control information. Hereinafter, a process of registering the information on the home device 101 through the user device 103 by the user will be described in more detail. FIG. 1 describes a process of registering one home device 101 as an example, but the process described in FIG. 1 may be equally applied to a process of registering each of all home devices, which can be installed in the house or outside the house, in the service server 109.

The user device 103 executes a smart home app according to a user input, performs pairing with the home device 101 at the same time when the smart home app is executed, and establishes a connection between the user device 103 and the home device 101 in operation 112.

Further, the user device 103 receives an authentication code issued from the account server 107 in operation 114, and transmits the authentication code and an account ID of the user device 103 to the home device 101 in operation 116. The account ID refers to an identifier of the user device 103 allocated by the account server 107, the authentication code refers to a key value used for receiving an access token from the account server 107 by the user device 101, and the access token refers to a key value used for authenticating a use right of the home device 101 by the connectivity server 105 when the home device 101 accesses the connectivity server 105.

The home device 101 receives the access token from the account server 107 in operation 118, and the user device 103 registers the home device 101 in the service server 109 in operation 120. Particularly, information on the home device 101 acquired through a pre-process is registered in operation 120.

Thereafter, the home device 101 logs into the connectivity server 105 by using the authentication code and the account ID received from the user device 103 and the access token received from the account server 107 in operation 122. Some of operations 112 to 122 described in FIG. 1 may be omitted, modified and/or combined according to a utilization example.

As described above, the process of registering the home device 101 in the server is performed through aforementioned processes 112 to 122. However, when there are a plurality of user devices in the home network system, all of the plurality of user devices should perform the registration process of each of operations 112 to 122, which inconveniences the users. Accordingly, in an embodiment of the present disclosure described below, a method of sharing registered information on the home device between terminals when there are a plurality of user devices in the home network system will be described.

Figure 2:
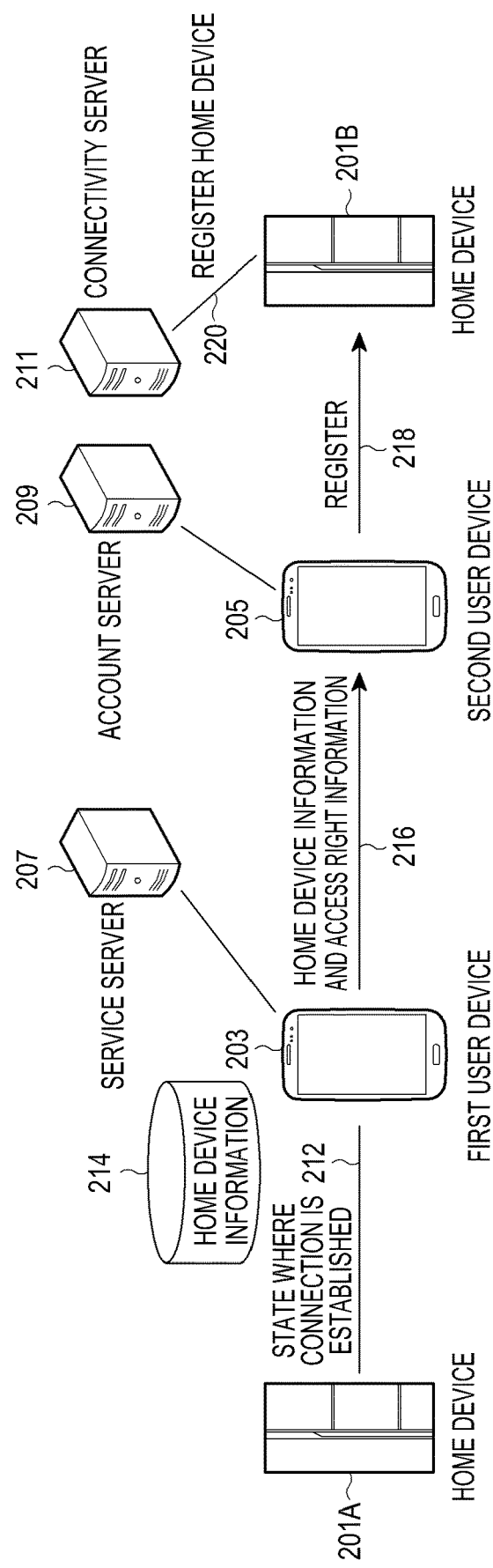
FIG. 2 illustrates an example of sharing home device information between user devices in a home network system according to an embodiment of the present disclosure.

FIG. 2 illustrates an example of sharing home device information between user devices in a home network system according to an embodiment of the present disclosure.

Referring to FIG. 2, an illustrated home network system includes a home device 201A, a home device 201B, a first user device 203, a second user device 205, a service server 207, an account server 209, and a connectivity server 211. It is assumed that the first user device 203 has already been connected to the home device 201A through a pre-process in operation 212, and home device information 214 on the home device 201A has been registered in the service server 207 through the registration process of operations 112 to 122 of FIG. 1.

The first user device 203 discovers user devices located in an area of the home network system, for example, in a house, office or similar area, collects information on the discovered user devices, and displays the information on a screen. Among the user devices, a user device to share the home device information 214 registered in the first user device 203 is selected according to a user input. Here, it is assumed that the user device selected by the user input is the illustrated second user device 205.

The first user device 203 transfers the home device information 214 and information on a right to access the home device 201A to the selected second user device 205 in operation 216. Here, the home device information 214 includes at least one of a UUID, peer ID (peerID), and peerGroupID, and the information on the right to access the connectivity server 211 includes a device token. The UUID refers to a unique ID of the home device 201A, and the peerID refers to an ID allocated by the service server 207 to allow the connectivity server 211 to identify the home device 201A. The peerGroupID indicates a group that includes home devices registered in the service server 207 through a particular user account, and the device token is issued to the first user device 203 by the home device 201A and indicates key information for authenticating access of the first user device 203 to the home device. In an embodiment of the present disclosure described below, information generated by combining the home device information and the information on the right to access the relevant home device is referred to as use right information and, accordingly, the use right information includes, for example, a UUID, peerID, peerGroupID, and device token.

The second user device 205 configures a connection with the home device 201B and registers, in the connectivity server 211, the home device 201A in the connectivity server 211 by using the use right information, that is, the home device information 214 and the information on the right to access the home device 201A, received from the first user device 203 in operation 218. The home device 201B registers the home device 201A in the connectivity server 211 in operation 220. Hereinafter, a process of registering the home device 201A in the connectivity server 211 will be described in more detail in FIG. 3.

Some of operations 212 to 220 described in FIG. 2 may be omitted, modified and/or combined according to a utilization example.

Figure 3:
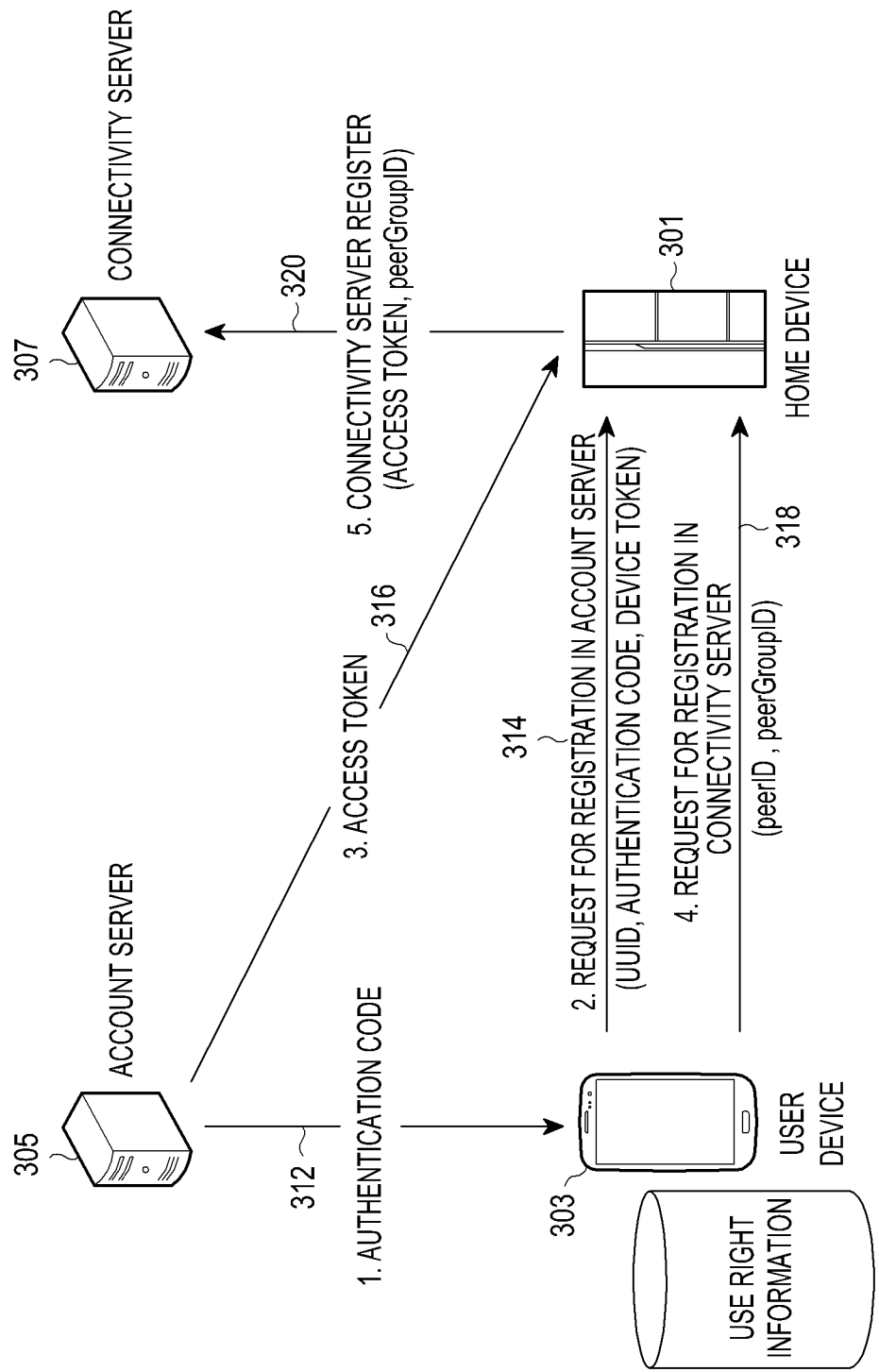
FIG. 3 illustrates an example of a process in which a user device that shares home device information with a neighboring user device in a home network system registers a relevant home device in a connectivity server according to an embodiment of the present disclosure.

FIG. 3 illustrates an example of a process in which a user device sharing home device information with a neighboring user device in a home network system registers a relevant home device in a connectivity server according to an embodiment of the present disclosure.

Referring to FIG. 3, a home network system includes a home device 301, a user device 303, an account server 305, and a connectivity server 307. It is assumed that the user device 303 shares information on a right to use the home device 301, for example, a UUID, peerID, peerGroupID, and device token, with a neighboring user device through operation 216 of FIG. 2. That is, the user device 303 stores and manages the UUID, peerID, peerGroupID, and device token of the home device 301.

The user device 303 receives an authentication code issued by the account server 305 in operation 312, and transmits an account server registration request message, which makes a request for registration in the account server 305 to the home device 301 in operation 314. The authentication code refers to a key value used for receiving an access token from the account server 305 by the home device 301, and the access token refers to a key value used for authenticating a use right of the home device 301 by the connectivity server 307 when the home device 301 accesses the connectivity server 307. Further, the account server registration request message includes the authentication code received from the account server 305, and the UUID and the device token, stored and managed by the user device 303.

The home device 301 also receives the access token from the account server 305 in operation 316, and then receives a connectivity server registration request message, which makes a request for registration in the connectivity server 307, from the user device 303 in operation 318. The connectivity server registration request message includes the peerID and the peerGroupID, stored and managed by the user device 303.

When the key value of the device token received in operation 314 is the same as the key value of the device token issued by the home device 301, the home device 301 is registered in the connectivity server 307 by using the access token received from the account server 305 and the peerGroupID received from the user device 303 in operation 320.

Some of operations 312 to 320 described in FIG. 3 may be omitted, modified and/or combined according to a utilization example.

Figure 4:
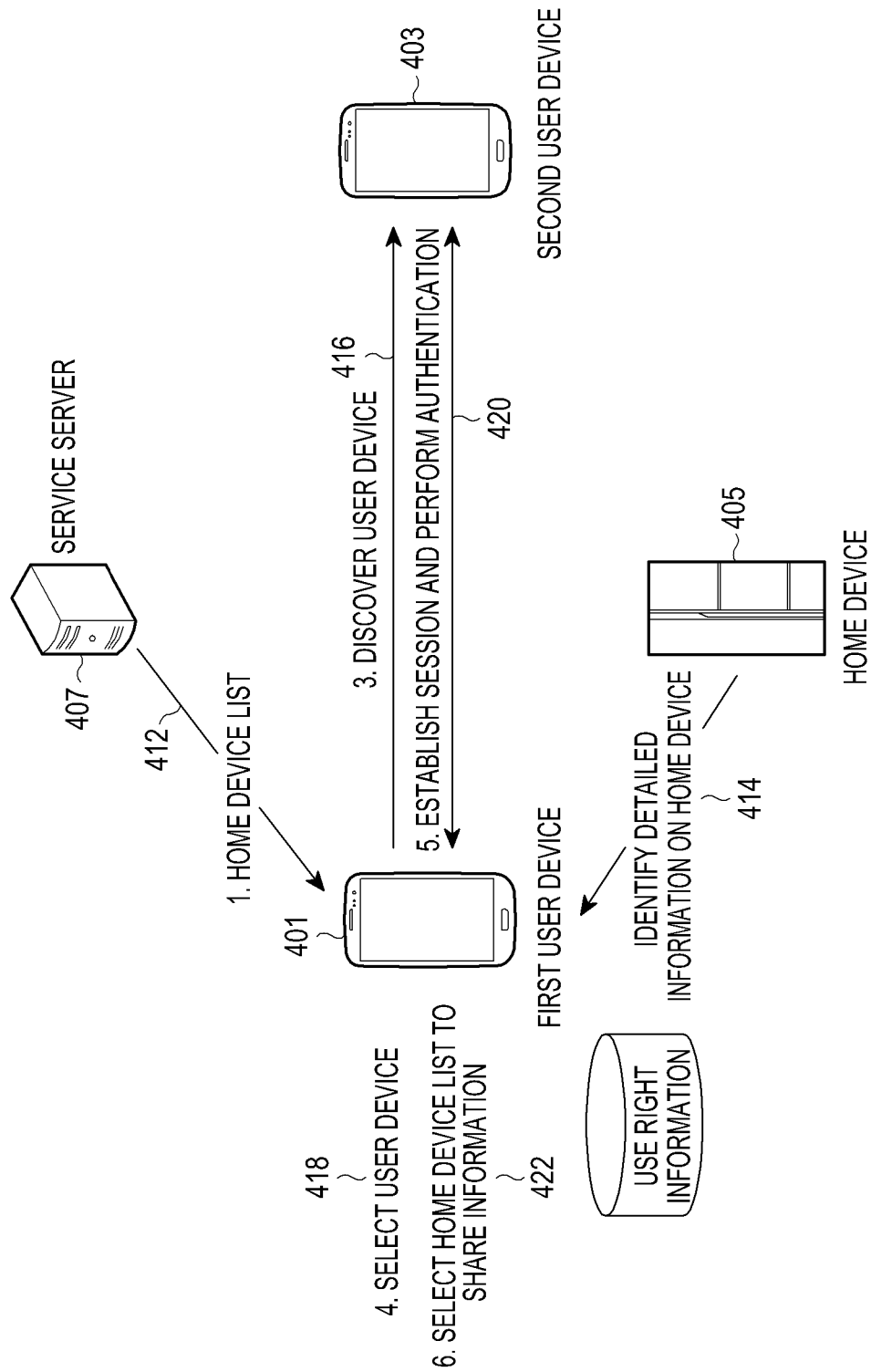
FIG. 4 illustrates an example of a pre-process performed to share home device information between user devices in a home network system according to an embodiment of the present disclosure.

FIG. 4 illustrates an example of a pre-process performed to share home device information between user devices in a home network system according to an embodiment of the present disclosure.

Referring to FIG. 4, an illustrated home network system includes a first user device 401, a second user device 403, a home device 405, and a service server 407. The first user device 401 can store and manage at least some use right information.

The first user device 401 receives a home device list, in which information on all home devices installed in the house or outside the house is recorded, from the service server 407 in operation 412, and identifies detailed information on a relevant home device, for example, the home device 405 from the home device list in operation 414.

The first user device 401 discovers neighboring user devices in operation 416, and selects a user device, for example, the second user device 403 to share home device information among the discovered devices in operation 418. Here, the neighboring user devices may be all user devices located in the house.

The first user device 401 configures a session and performs an authentication process with the second user device 403 in operation 420, and then selects information on at least one home device to be shared with the second user device 403, that is, at least one home device list from the information on the home devices stored and managed by the first user device 401 in operation 422.

Although not illustrated, the first user device 401 transfers information on a right to use the home device included in the home device list selected in operation 422 to the second user device 403 and shares information on the relevant home device with the second user device 403. Here, a method of transferring the use right information to the second user device 403 may be divided into a first method by which the first user device 401 directly transfers the use right information to the second use device 403, a second method by which the first user device 401 transfers the home device information of the use right information to the second user device 403 via the service server 407 and directly transfers the remaining access right information to the second user device 403, and a third method by which the first user device 401 transfers the use right information to the second user device 403 through the service server 407.

Some of operations 412 to 420 described in FIG. 4 may be omitted, modified and/or combined according to a utilization example.

In an embodiment of the present disclosure described below, the first method, second method and third method of transferring the use right information to the second user device 403 will be described in more detail in FIGS. 5 to 7.

Figure 5:
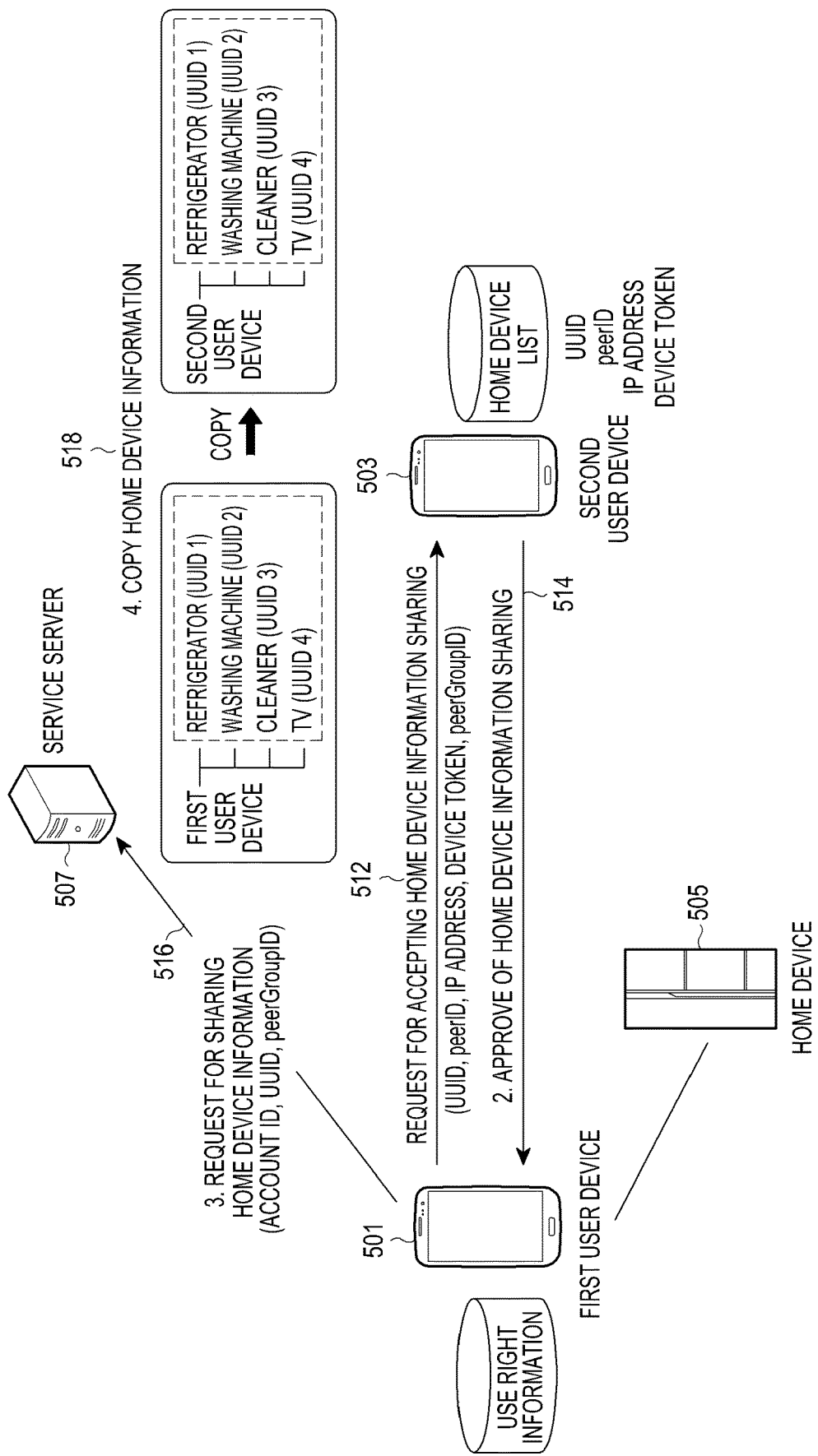
FIG. 5 illustrates an example of a process in which a user device directly transfers use right information to a neighboring user device in a home network system according to an embodiment of the present disclosure.

FIG. 5 illustrates an example of a process in which a user device directly transfers use right information to a neighboring user device in a home network system according to an embodiment of the present disclosure.

Referring to FIG. 5, an illustrated home network system includes a first user device 501, a second user device 503, a home device 505, and a service server 507. Here, it is assumed that the first user device 501 and the second user device 503 have completed the pre-process performed to share the home device information described in FIG. 4. The first user device 501 can store and manage at least some use right information of the home device 505, and second user device 503 can store and manage home device list.

The first user device 501 transmits a home device information sharing acceptance request message, which makes a request for accepting home device information sharing to the second user device 503 selected share the home device information in operation 512. The second user device 503 transmits a home device information sharing approval message, which approves of the home device information sharing, to the first user device 501 in response to the home device information sharing acceptance request message in operation 514. The home device information sharing acceptance request message includes home device information on at least one home device, that is, a UUID, peerID, IP address, device token corresponding to information on a right to access at least one home device, and peerGroupID. Here, it is assumed that at least one home device is, for example, a refrigerator, washing machine, cleaner, or TV.

Thereafter, the first user device 501 transmits a home device information sharing request message, which makes a request for sharing home device information to the service server 507 in operation 516. The service server 507 copies the home device information such that the home device information on the second user device 503 becomes the same as the registered home device information on the first user device 501 in operation 518. The home device information sharing request message includes an account ID, UUID, and peerGroupID of the second user device 503.

Some of operations 512 to 518 described in FIG. 5 may be omitted, modified and/or combined according to a utilization example.

Figure 6:
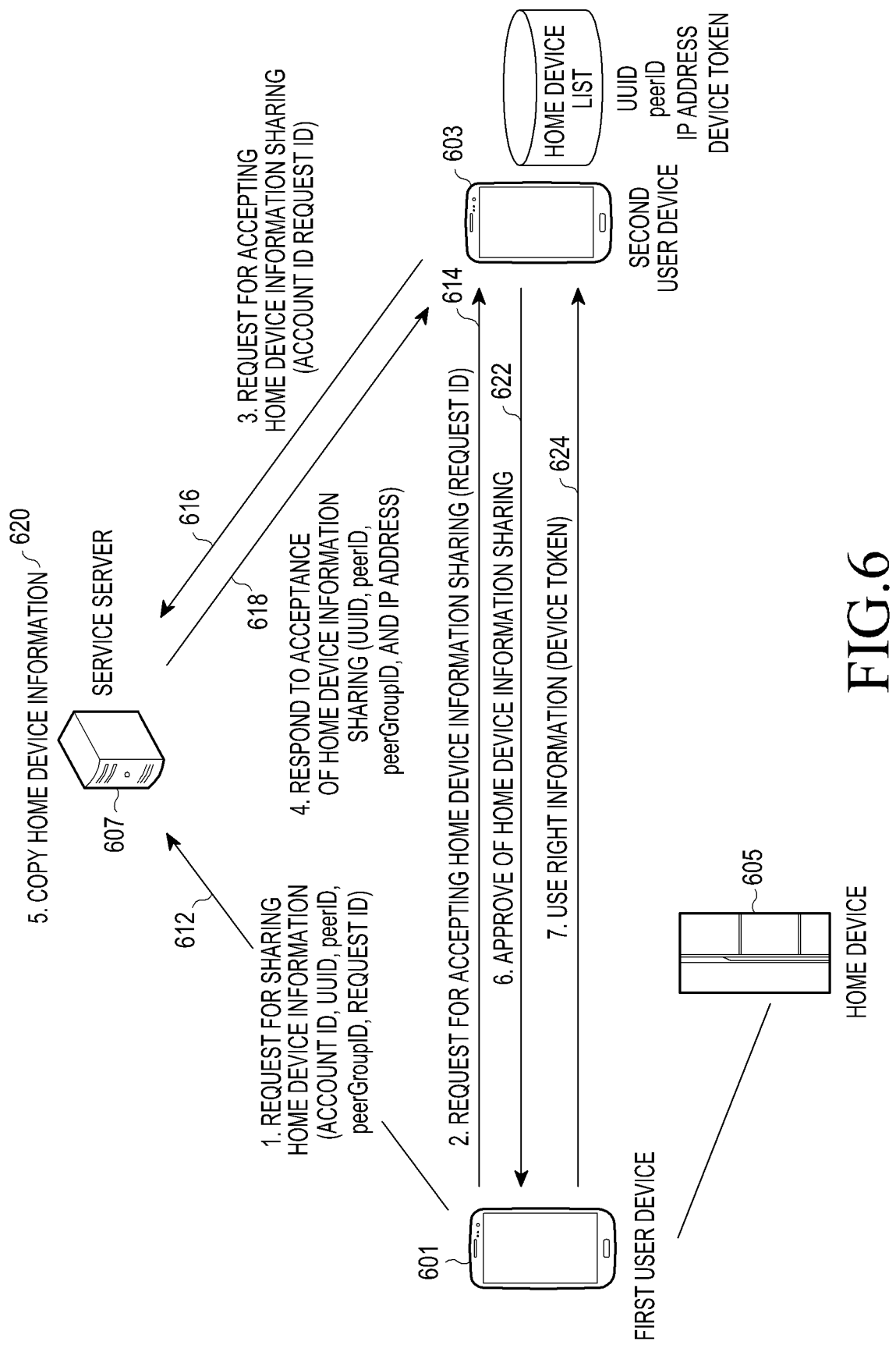
FIG. 6 illustrates an example of a process in which a user device transfers home device information of use right information to a neighboring user device via a service server and directly transfers remaining access right information to the neighboring user device in a home network system according to an embodiment of the present disclosure.

FIG. 6 illustrates an example of a process in which a user device transfers home device information of use right information to a neighboring user device via a service server and directly transfers remaining access right information to the neighboring user device in a home network system according to an embodiment of the present disclosure.

Referring to FIG. 6, an illustrated home network system includes a first user device 601, a second user device 603, a home device 605, and a service server 607. Here, it is assumed that the first user device 601 and the second user device 603 have completed the pre-process performed to share the home device information described in FIG. 4. The second user device 603 can store and manage a home device list.

The first user device 601 transmits a home device information sharing request message, which makes a request for sharing information on the home device, to the service server 607 in operation 612. The home device information sharing request message includes a UUID, peerID, and peerGroupID corresponding to the home device information of the information on the right to use at least one home device, and an account ID and request ID of the second user device 603. The request ID indicates a trust key value used for a mutual authentication between the first user device 601 and the second user device 603. Further, the first user device 601 transmits a home device information sharing acceptance request message, which makes a request for accepting home device information sharing, to the second user device 603 in operation 614. The home device information sharing acceptance request message includes the request ID transmitted to the service server 607.

The second user device 603 transmits a home device information sharing acceptance request message to the service server 607 in operation 616, and the home device information sharing acceptance request message includes the account ID of the second user device 603 and the request ID received from the first user device 601.

The service server 607 inspects a request ID validation by comparing the request ID received from the second user device 603 and the request ID received from the first user device 601. When the request ID received from the second user device 603 is the same as the request ID received from the first user device 601, the service server 607 transmits a home device information sharing acceptance response message to the second user device 603 in response to the home device information sharing acceptance request message, which has been received in operation 616, in operation 618. The home device information sharing acceptance response message includes home device information on at least one home device, that is, a UUID, peerID, peerGroupID, and IP address.

Thereafter, the service server 607 copies the home device information such that the home device information on the second user device 603 becomes the same as the registered home device information on the first user device 601 in operation 620.

The second user device 603 transmits a home device information sharing approval message, which approves of the home device information sharing, to the first user device 601 in response to the home device information sharing acceptance request message, which has been received in operation 614, in operation 622. The first user device 601 having received the information sharing approval message, transmits access right information of the use right information, that is, the device token to the second user device 603 in operation 624.

Some of operations 612 to 624 described in FIG. 6 may be omitted, modified and/or combined according to a utilization example.

Figure 7:
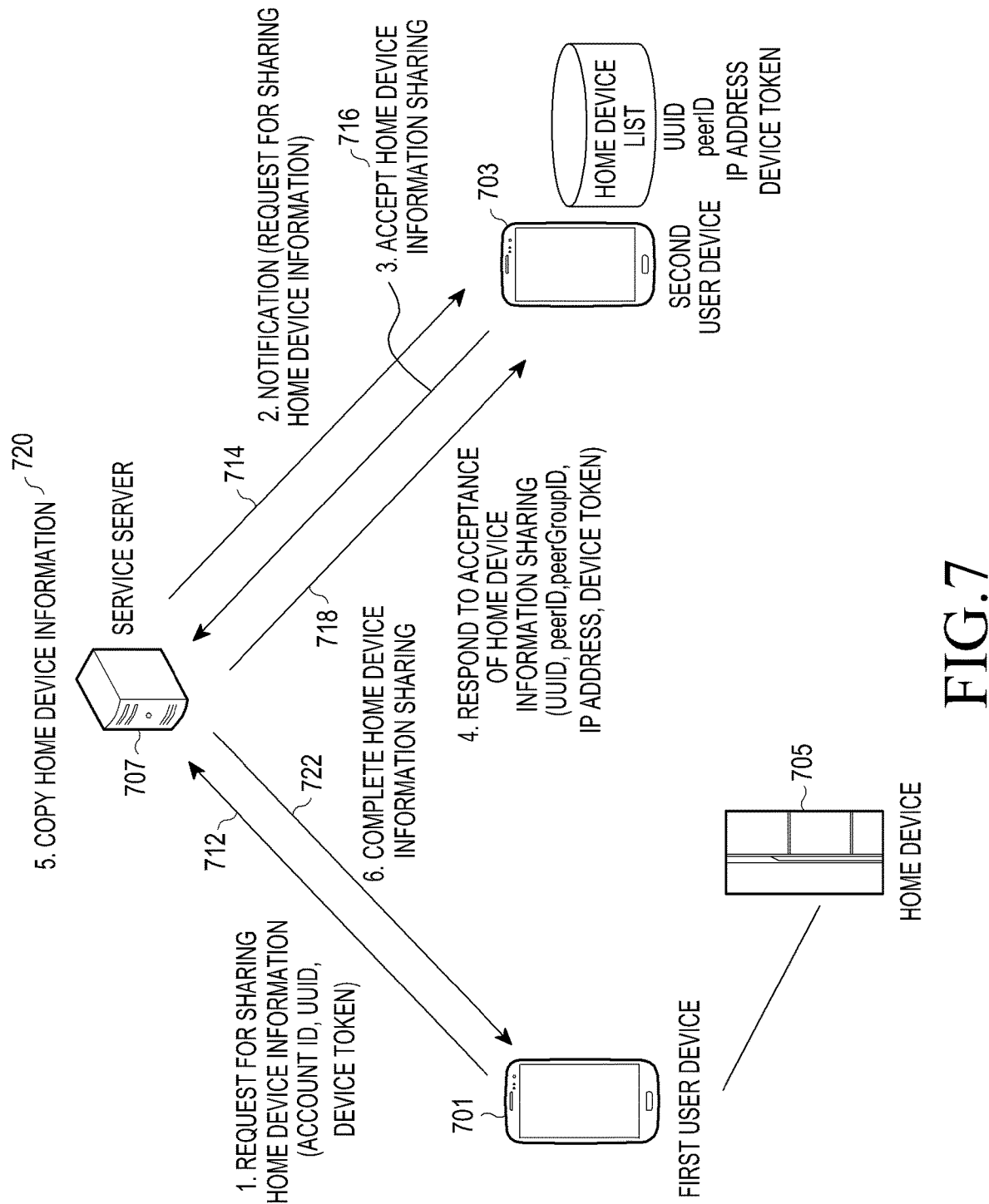
FIG. 7 illustrates an example of a process in which a user device transfers use right information to a neighboring user device through a service server in a home network system according to an embodiment of the present disclosure.

FIG. 7 illustrates an example of a process in which a user device transfers use right information to a neighboring user device through a service server in a home network system according to an embodiment of the present disclosure.

Referring to FIG. 7, an illustrated home network system includes a first user device 701, a second user device 703, a home device 705, and a service server 707. Here, it is assumed that the first user device 701 and the second user device 703 have completed the pre-process performed to share the home device information described in FIG. 4. The second user device 703 can store and manage a home device list.

The first user device 701 transmits a home device information sharing request message, which makes a request for sharing information on the home device, to the service server 707 in operation 712. The home device information sharing request message includes a UUID corresponding to home device information among information on a right to use at least one home device, a device token corresponding to access right information of the use right information, and an account ID of the second user device 703.

The service server 707 transmits a notification message indicating that the first device 701 makes a request for sharing home device information to the second user device 703 in operation 714, and the second user device 703 transmits a home device information sharing acceptance message, which accepts the home device information sharing request, to the service server 707 in operation 716.

The service server 707 transmits a home device information sharing acceptance response message in response to the home device information sharing acceptance message, which has been received in operation 716, in operation 718. The home device information sharing acceptance response message includes information on a right to use at least one home device, that is, a UUID, peerID, peerGroupID, device token, and IP address. Further, the service server 707 copies the home device information such that the home device information on the second user device 703 becomes the same as the registered home device information on the first user device 701 in operation 720.

Thereafter, the service server transmits a home device information sharing completion message, which indicates that the sharing of the home device information with the second user device 703 is completed, to the first user device 701 in response to the home device information sharing request message, which has been received in operation 712, in operation 722.

Some of operations 712 to 722 described in FIG. 7 may be omitted, modified and/or combined according to a utilization example.

Figure 8:
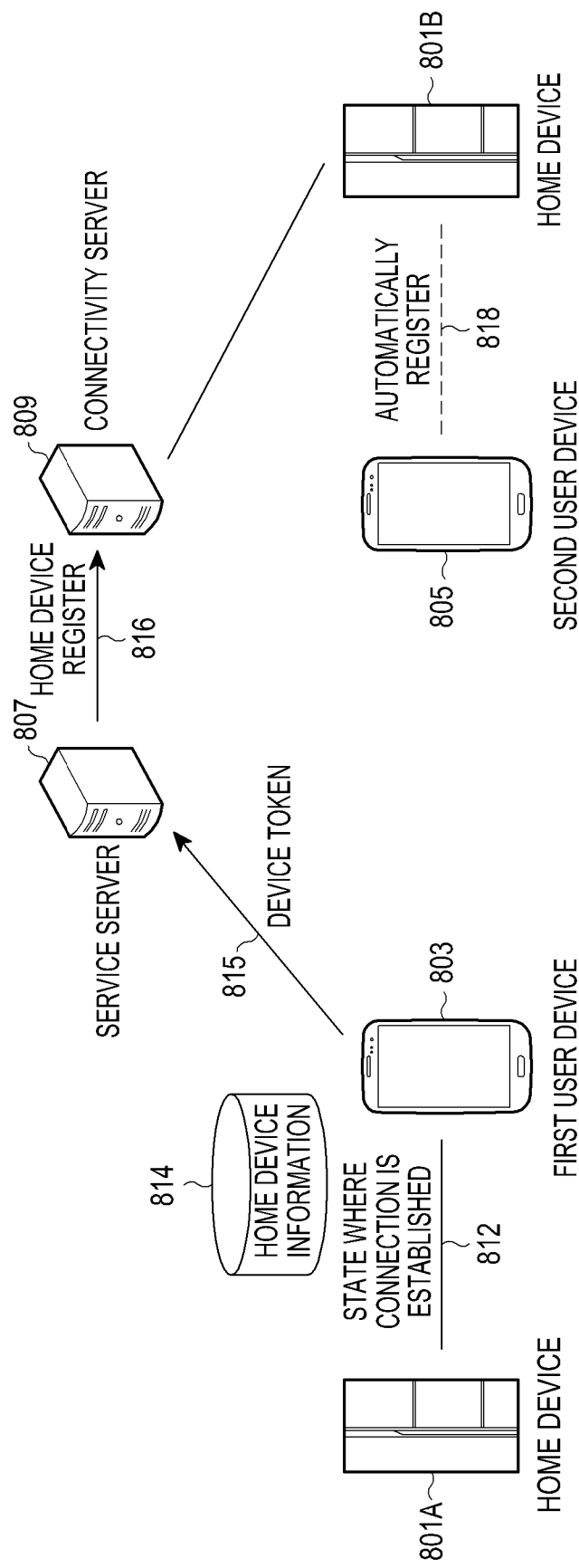
FIG. 8 illustrates an example of sharing home device information between user devices in a home network system according to an embodiment of the present disclosure.

FIG. 8 illustrates an example of sharing home device information between user devices in a home network system according to an embodiment of the present disclosure.

Referring to FIG. 8, an illustrated home network system includes a home device 801A, a home device 801B, a first user device 803, a second user device 805, a service server 807, and a connectivity server 809. It is assumed that the first user device 803 has been already connected to the home device 801A through a pre-process in operation 812, and home device information 814 on the home device 801A has been registered in the service server 807 through the registration process of operations 112 to 122 of FIG. 1.

The first user device 803 discovers user devices located in an area of the home network system, for example, in the house, collects information on the discovered user devices, and displays the information on a screen. Among the user devices, a user device is selected according to user input to share home device information 814 registered in the first user device 803. Here, it is assumed that the user device selected by the user input is the illustrated second user device 805.

The first user device 803 transfers a device token corresponding to information on a right to access the home device 801A to the service server 807 in operation 815, and the service server 807 registers the home device 801A in the connectivity server 809 in operation 816. The connectivity server 809 adds a peerID of the home device 801A to a peer group of the second user device 805, and the home device 801A is automatically registered in the second user device 805 in operation 818.

Some of operations 812 to 818 described in FIG. 8 may be omitted, modified and/or combined according to a utilization example.

Hereinafter, a process of automatically registering the home device 801A in the second user device 805 will be described in more detail with reference to FIG. 9.

Figure 9:
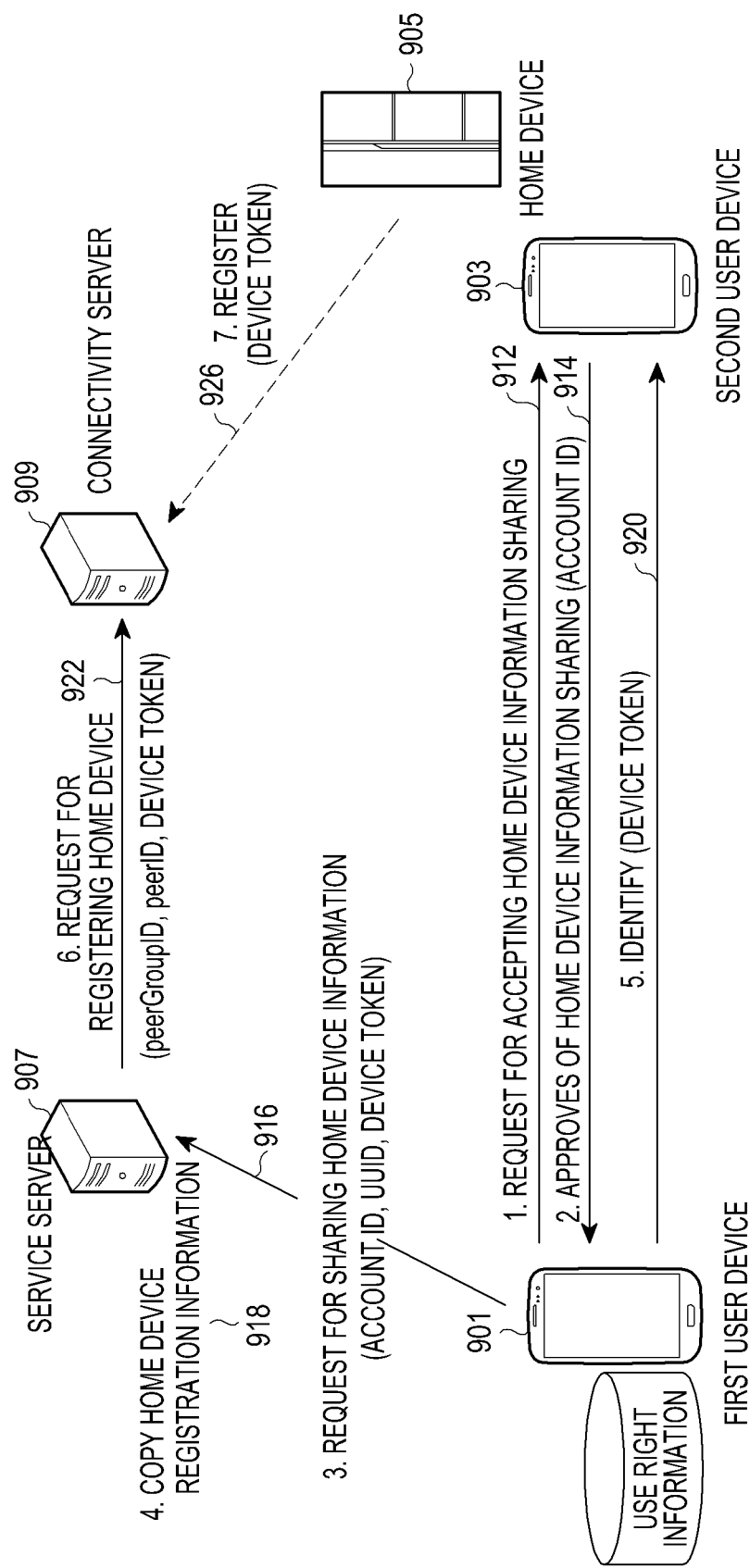
FIG. 9 illustrates an example of a process of automatically registering a home device in a user device in a home network system according to an embodiment of the present disclosure.

FIG. 9 illustrates an example of a process of automatically registering a home device in a user device in a home network system according to an embodiment of the present disclosure.

Referring to FIG. 9, an illustrated home network system includes a first user device 901, a second user device 903, a home device 905, a service server 907, and a connectivity server 909. It is assumed that the first user device 901 and the second user device 903 have completed the pre-process performed to share the home device information described in FIG. 4. The first user device 901 can store and manage at least some use right information.

The first user device 901 transmits a home device information sharing acceptance request message, which makes a request for accepting home device information sharing, to the second user device 903 in operation 912. The second user device 903 transmits a home device information sharing approval message, which approves of the home device information sharing, to the first user device 901 in response to the home device information sharing acceptance request message, which has been received in operation 912, in operation 914. The home device information sharing approval message includes an account ID of the second user device 903.

The first user device 901 transmits a home device information sharing request message, which makes a request for sharing information on the home device 905, to the service server 907 in operation 916. The home device information sharing request message includes a UUID corresponding to home device information among information on a right to use at least one home device, a device token corresponding to access right information of the use right information, and an account ID of the second user device 903.

The service server 907 copies the home device information such that the home device information on the first user device 903 becomes the same as the registered home device information on the first user device 901 in operation 918. Thereafter, the first user device 901 transmits an acknowledge message to the second user device 903 in response to the home device information sharing approval message, which has been received in operation 914, in operation 920. The acknowledge message includes a device token corresponding to access right information contained in the information on the right to use at least one home device.

The service server 907 transmits a home device registration request message, which makes a request for registering the home device 905, to the connectivity server 909 in operation 922. The home device registration request message includes a peerGroupID and peerID corresponding to home device information among the information on the right to use at least one home device, and a device token corresponding to access right information contained in the use right information. The connectivity server 909 adds the peerID of the home device 905 to a peer group of the second user device 903 and registers the home device 905 in the connectivity server 909 in operation 926. At this time, the connectivity server 909 uses the device token received from the service server 907 to register the home device 905.

Some of operations 912 to 926 described in FIG. 9 may be omitted, modified and/or combined according to a utilization example.

Figure 10:
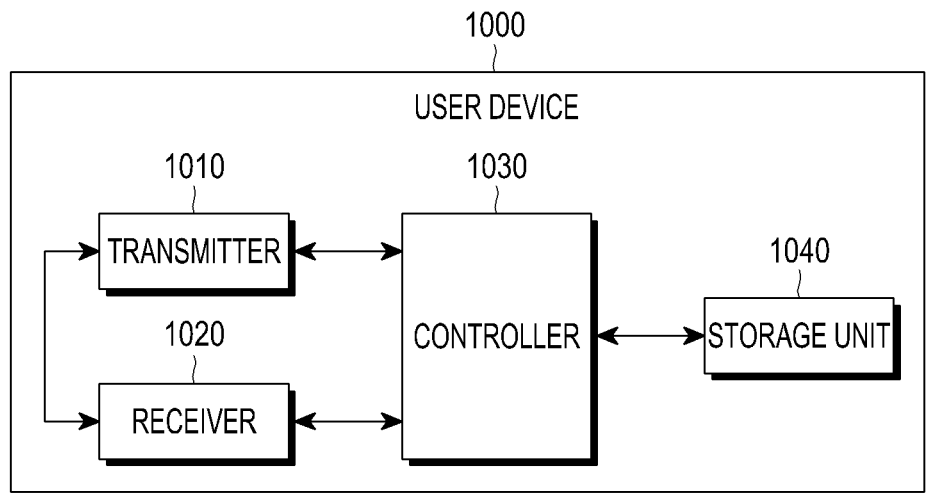
FIG. 10 is a device block diagram illustrating an internal configuration of a user device which shares home device information in a home network system according to an embodiment of the present disclosure.

FIG. 10 is a device block diagram illustrating an internal configuration of a user device which shares home device information in a home network system according to an embodiment of the present disclosure.

Referring to FIG. 10, an illustrated user device 1000 includes a transmitter 1010, a receiver 1020, a controller 1030, and a storage unit 1040.

The controller 1030 controls the general operation of the user device 1000. Particularly, the controller 1030 controls the general operation related to home device information sharing according to an embodiment of the present disclosure. Here, since the general operation related to the home device information sharing is the same as that described with reference to FIGS. 5 to 7 and 9, an additional detailed description thereof will be omitted.

The transmitter 1010 transmits various messages according to a control of the controller 1030. Here, since the various messages transmitted by the transmitter 1010 are the same as those described with reference to FIGS. 5 to 7 and 9, an additional detailed description thereof will be omitted.

The receiver 1020 receives various messages according to a control of the controller 1030. Here, since the various messages received by the receiver 1020 are the same as those described with reference to FIGS. 5 to 7 and 9, an additional detailed description thereof will be omitted.

Although FIG. 10 illustrates a case where the user device 1000 is implemented by separate units such as the transmitter 1010, receiver 1020, controller 1030, and storage unit 1040, the user device 1000 can be implemented by one unit in which at least two of the transmitter 1010, receiver 1020, controller 1030, and storage unit 1040 are integrated.

Figure 11:
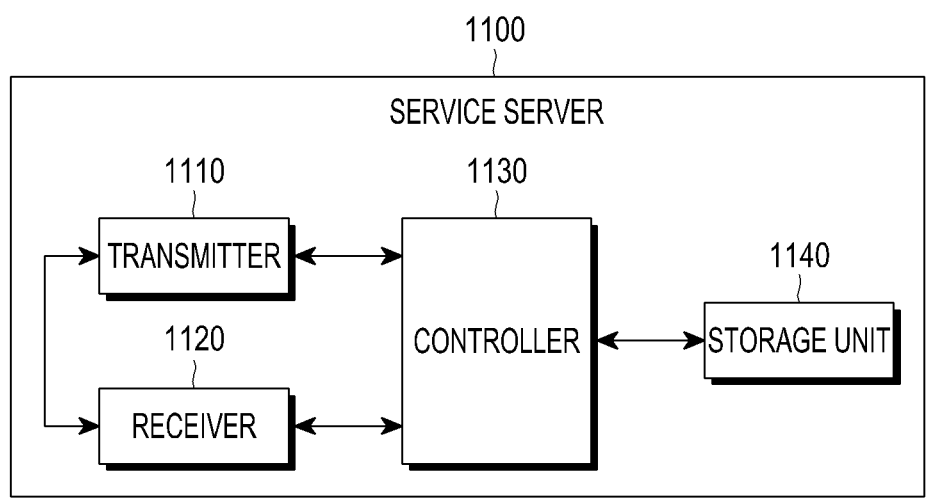
FIG. 11 is a device block diagram illustrating an internal configuration of a service server which shares home device information in a home network system according to an embodiment of the present disclosure.

FIG. 11 is a device block diagram illustrating an internal configuration of a service server which shares home device information in a home network system according to an embodiment of the present disclosure.

Referring to FIG. 11, an illustrated service server 1100 includes a transmitter 1110, a receiver 1120, a controller 1130, and a storage unit 1140.

The controller 1130 controls the general operation of the service server 1100. Particularly, the controller 1130 controls the general operation related to home device information sharing according to an embodiment of the present disclosure. Here, since the general operation related to the home device information sharing is the same as that described with reference to FIGS. 5 to 7 and 9, an additional detailed description thereof will be omitted.

The transmitter 1110 transmits various messages according to a control of the controller 1130. Here, since the various messages transmitted by the transmitter 1110 are the same as those described with reference to FIGS. 5 to 7 and 9, an additional detailed description thereof will be omitted.

The receiver 1120 receives various messages according to a control of the controller 1030. Here, since the various messages received by the receiver 1120 are the same as those described with reference to FIGS. 5 to 7 and 9, an additional detailed description thereof will be omitted.

Although FIG. 11 illustrates a case where the user device 1100 is implemented by separate units such as the transmitter 1110, receiver 1120, controller 1130, and storage unit 1140, the user device 1100 can be implemented by one unit in which at least two of the transmitter 1110, receiver 1120, controller 1130, and storage unit 1140 are integrated.

Figure 12:
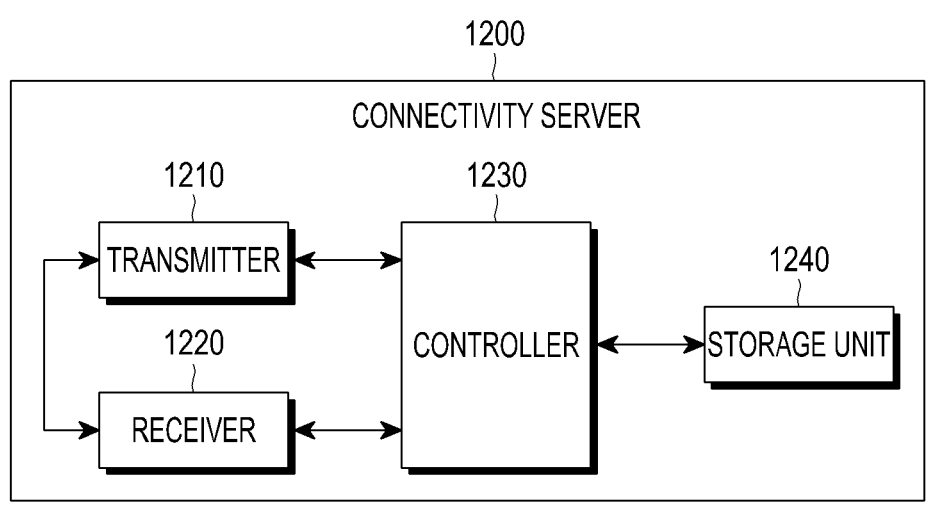
FIG. 12 is a device block diagram illustrating an internal configuration of a connectivity server which shares home device information in a home network system according to an embodiment of the present disclosure.

FIG. 12 is a device block diagram illustrating an internal configuration of a connectivity server which shares home device information in a home network system according to an embodiment of the present disclosure.

Referring to FIG. 12, an illustrated connectivity server 1200 includes a transmitter 1210, a receiver 1220, a controller 1230, and a storage unit 1240.

The controller 1230 controls the general operation of the connectivity server 1200. Particularly, the controller 1130 controls the general operation related to home device information sharing according to an embodiment of the present disclosure. Here, since the general operation related to the home device information sharing is the same as that described with reference to FIGS. 5 to 7 and 9, an additional detailed description thereof will be omitted.

The transmitter 1210 transmits various messages according to a control of the controller 1230. Here, since the various messages transmitted by the transmitter 1210 are the same as those described with reference to FIGS. 7 and 9, an additional detailed description thereof will be omitted.

The receiver 1220 receives various messages according to a control of the controller 1230. Here, since the various messages received by the receiver 1220 are the same as those described with reference to FIGS. 5 to 7 and 9, an additional detailed description thereof will be omitted.

Although FIG. 12 illustrates a case where the user device 1200 is implemented by separate units such as the transmitter 1210, receiver 1220, controller 1230, and storage unit 1240, the user device 1200 can be implemented by one unit in which at least two of the transmitter 1210, receiver 1220, controller 1230, and storage unit 1240 are integrated.

It may be understood that an apparatus and method for transferring home device-related information by a user device according to the present disclosure can be implemented in the form of hardware, software, or a combination thereof. Any such software may be stored, for example, in a volatile or non-volatile storage device such as a read only memory (ROM), random access memory (RAM), memory chip, memory device, or memory integrated circuit (IC), or a recordable optical or magnetic medium such as a compact disc (CD), DVD, magnetic disk, or magnetic tape, regardless of its ability to be erased or its ability to be re-recorded. A web widget manufacturing method of the present disclosure can be realized by a computer or a portable terminal including a controller and a memory, and it can be seen that the memory corresponds to an example of the storage medium which is suitable for storing a program or programs including instructions by which the embodiments of the present disclosure are realized, and is machine readable.

Accordingly, the present disclosure includes a program for code implementing the apparatus and method described in the appended claims of the specification and a machine (such as a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus for transferring home device-related information by a user device, according to an embodiment of the present disclosure, may receive a program from a program providing apparatus connected through a wire or wirelessly and store the received program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method of sharing information related to a home device in a home network system by a first device, the method comprising:
    establishing a session with at least one second device;
    receiving, from at least one specified home device, first identification information of the at least one specified home device, second identification information of the at least one specified home device managed by a connectivity server configured to manage a connection between the first device and the at least one specified home device, third identification information for identifying a group of the at least one specified home device, and first authentication information including information on a key for authenticating access to the at least one specified home device; and
    transmitting the first identification information, the second identification information, the third identification information, and the first authentication information to the at least one second device,
    wherein the first identification information includes a unique user identifier (UUID), the second identification information includes a peer ID, the third identification information includes a peer group ID, and the first authentication information includes a device token.

2. The method of claim 1, wherein the transmitting of the first identification information, the second identification information, the third identification information, and the first authentication information comprises:
    directly transmitting the first identification information, the second identification information, the third identification information, and the first authentication information from the first device to the at least one second device.

3. The method of claim 1, wherein the transmitting of the first identification information, the second identification information, the third identification information, and the first authentication information comprises:
    transmitting the first identification information, the second identification information, and the third identification information from the first device to the at least one second device through a service server by using a request ID indicating a trust key value used for a mutual authentication between the first device and the at least one second device; and
    directly transmitting the first authentication information from the first device to the at least one second device.

4. The method of claim 3, wherein the group of the at least one specified home device is registered in the service server.

5. The method of claim 1, wherein the transmitting of the first identification information, the second identification information, the third identification information, and the first authentication information comprises:
transmitting the first identification information, the second identification information, the third identification information, and the first authentication information from the first device to the at least one second device through a service server by using the first identification information and the first authentication information.

6. A first device for sharing information related to a home device in a home network system, the first device comprising:
at least one hardware implemented controller, wherein the at least one hardware implemented controller is configured to:
establish a session with at least one second device;
receive, from at least one specified home device, first identification information of the at least one specified home device, second identification information for identifying the at least one specified home device managed by a connectivity server configured to manage a connection between the first device and the at least one specified home device, third identification information for identifying a group of the at least one specified home device, and a first authentication information including information on a key for authenticating access to the at least one specified home device; and
transmit the first identification information, the second identification information, the third identification information, and the first authentication information to the at least one second device,
wherein the first identification information includes a unique user identifier (UUID), the second identification information includes a peer ID, the third identification information includes a peer group ID, and the first authentication information includes a device token.

7. The first device of claim 6, wherein the at least one hardware implemented controller is further configured to:
directly transmit the first identification information, the second identification information, the third identification information, and the first authentication information from the first device to the at least one second device.

8. The first device of claim 6, wherein the at least one hardware implemented controller is further configured to:
transmit the first identification information, the second identification information, and the third identification information from the first device to the at least one second device through a service server by using a request ID indicating a trust key value used for a mutual authentication between the first device and the at least one second device; and
directly transmit the first authentication information from the first device to the at least one second device.

9. The first device of claim 8, wherein a group of home devices is registered in the service server.

10. The first device of claim 6, wherein the at least one hardware implemented controller is further configured to:
transmit the first identification information, the second identification information, the third identification information, and the first authentication information from the first device to the at least one second device through a service server by using the first identification information and the first authentication information.

11. A service server for sharing information related to a home device in a home network system, the service server comprising:
a receiver;
a transmitter; and
at least one controller, wherein at least one controller is configured to:
receive, from a first device, first identification information of a specified home device, second identification information of the specified home device managed by a connectivity server configured to manage a connection between the first device and the specified home device, third identification information for identifying a group of home devices or first authentication information including information on a key for authenticating access to the specified home device, and
store the first identification information, the second identification information, the third identification information or the first authentication information as a home device registration information for at least one second device,
wherein the first device and the at least one second device are in a state where a session is established, and
wherein the first identification information includes a unique user identifier (UUID), the second identification information includes a peer ID, the third identification information includes a peer group ID, and the first authentication information includes a device token.

12. The service server of claim 11, wherein the at least one controller is further configured to:
receive the first identification information, the second identification information, the third identification information, and a first request ID indicating a trust key value used for a mutual authentication between the first device and at least one second device; and
receive a second request ID from the at least one second device.

13. The service server of claim 12, wherein the at least one controller is further configured to:
compare the first request ID received from the first device and the second request ID received from the at least one second device.

14. The service server of claim 13, wherein the at least one controller is further configured to:
transmit the first identification information, the second identification information, and the third identification information from the first device to the at least one second device when the first request ID received from the first device corresponds to the second request ID received from the at least one second device.

* * * * *